United States Patent [19]

Jones

[11] Patent Number: 5,263,467
[45] Date of Patent: Nov. 23, 1993

[54] GAS GRILL ASSEMBLY

[75] Inventor: Jack L. Jones, Ogden, Utah
[73] Assignee: Jonco Industries, Inc., Ogden, Utah
[21] Appl. No.: 837,072
[22] Filed: Feb. 14, 1992
[51] Int. Cl.$^5$ ............................................. F24C 3/12
[52] U.S. Cl. .................................... 126/42; 126/37 B; 126/52
[58] Field of Search .................. 126/42, 41 R, 41 D, 126/25 R, 24, 30, 37 R, 37 B, 39 R, 39 N, 52

[56] References Cited

U.S. PATENT DOCUMENTS

| | | | |
|---|---|---|---|
| 1,000,485 | 8/1911 | Avery | 126/52 |
| 1,035,208 | 8/1912 | Madden | 126/52 |
| 1,179,340 | 4/1916 | Smith | 126/19 M X |
| 2,292,735 | 8/1942 | Besocke | 126/42 |
| 2,314,095 | 3/1943 | Lawrence | 126/42 |
| 2,514,133 | 7/1950 | Barre et al. | 126/42 |
| 2,578,227 | 11/1951 | Chambers | 126/39 N |
| 2,655,142 | 10/1953 | Phares | 126/42 |
| 2,882,382 | 4/1959 | Woxman | 126/19 M X |
| 3,064,554 | 11/1962 | Lamb | 126/42 X |
| 3,130,719 | 4/1964 | Mayer et al. | 126/42 |
| 3,169,517 | 2/1965 | Maier | 126/52 |
| 3,692,351 | 9/1972 | Christopher et al. | 126/41 R X |

*Primary Examiner*—Larry Jones
*Attorney, Agent, or Firm*—Berne S. Broadbent

[57] ABSTRACT

A gas grill assembly comprising a housing, a grill, and a retractor arm assembly. The housing encloses the assembly and is permanently mountable in the wall of a recreation vehicle. The retractor arm assembly supports the grill and is connected between the housing and the grill such that the grill can be extended from the housing for use. The grill is advantageously mounted to the retractor arm assembly by means of a post such that, in this extended position, the grill can rotate approximately 180 degrees in either direction about a vertical axis. The retractor arm assembly is operably coupled to the main gas supply valve such that the valve is rotated to an open position as the grill is pulled out of the housing for use. Conversely, when the grill is pushed back into the housing, the movement of the retractor arm assembly rotates the gas supply valve to a closed position, thereby automatically shutting off the supply of gas to the grill.

3 Claims, 7 Drawing Sheets ered embodiment of the gas grill assembly of the present invention showing the assembly mounted in an external wall of a recreational vehicle and extended from the assembly housing for use;
GAS GRILL ASSEMBLY

BACKGROUND

1. The Field of the Invention

This invention relates to gas grills for use in outdoor cooking and, more particularly, to a novel grill assembly which may be permanently mounted in an outside wall of a recreational vehicle and which includes a safety mechanism for automatically shutting off the gas supply from its source when the grill is not in use.

2. The Background Art

User's of recreational vehicles (such as, for example, trailers, motor homes, campers, and boats), often find it desirable to cook meals outside the vehicle. This of course frees the vehicle for other uses during meal preparation. In addition, cooking odors are thus taken outside and do not linger in an inside cooking area after mealtime.

Outdoor cooking may be done using a conventional coal barbecue or similar apparatus. In order to decrease the necessary set-up and clean-up times, however, gas (e.g., propane) grills are more often used. These gas grills may be stored inside the vehicle and then set up outside the vehicle prior to use or, more conveniently, may be stored and/or mounted in an external storage compartment.

Gas cooking grills are typically constructed such that a gas supply is connected to the grill by means of a flexible tube after the grill is set up. Normal setup thus requires that the grill be placed in the desired position and then connected to the gas supply by means of the flexible tube. The gas supply is then turned on, thereby providing fuel to the grill burners.

After use, the reverse procedure is followed. The grill burners and the main gas supply are first turned off. The grill is then disconnected from the gas supply and returned to storage.

This conventional grill setup and storage procedure may, of course, become cumbersome, thereby discouraging frequent use of the grill. Consequently, in some cases, perhaps with the thought that the grill will be used again soon, the grill is stored without being disconnected from the main gas supply.

Unfortunately, the flexible tube which connects the grill to the gas supply may become worn as the unit is moved from place to place to the point where it will allow some gas leakage. Gas leakage may also occur around the tube couplings and/or in the event one of the grill burner valves is not completely closed. As a result, therefore, storage of gas grills without first disconnecting them from the gas supply not only wastes gas but may result in gas inhalation, explosion or other hazards.

BRIEF SUMMARY AND OBJECTS OF THE INVENTION

In view of the foregoing, it is a primary object of the present invention to provide a gas cooking grill which is automatically disconnected from the main gas supply when the grill is not in use.

It is also an object of the present invention to provide a gas cooking grill which is readily accessible for use without any time consuming setup procedure.

Further, it is an object of the present invention to provide a gas cooking grill which may be safely mounted and stored in the wall of a recreation vehicle.

Consistent with the foregoing objects, and in accordance with the invention as embodied and broadly described herein, a gas grill assembly is disclosed in one embodiment of the present invention as including a housing, a grill, and a retractor arm assembly. The housing encloses the assembly and is permanently mountable in the wall of a recreation vehicle. The retractor arm assembly supports the grill and is connected between the housing and the grill such that the grill can be extended from the housing for use. The grill is advantageously mounted to the retractor arm assembly by means of a post such that, in this extended position, the grill can rotate approximately 180 degrees in either direction about a vertical axis.

Significantly, the retractor arm assembly is operably coupled to the main gas supply valve such that the valve is rotated to an open position as the grill is pulled out of the housing for use. Conversely, when the grill is pushed back into the housing, the movement of the retractor arm assembly rotates the gas supply valve to a closed position, thereby automatically shutting off the supply of gas to the grill.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 7, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
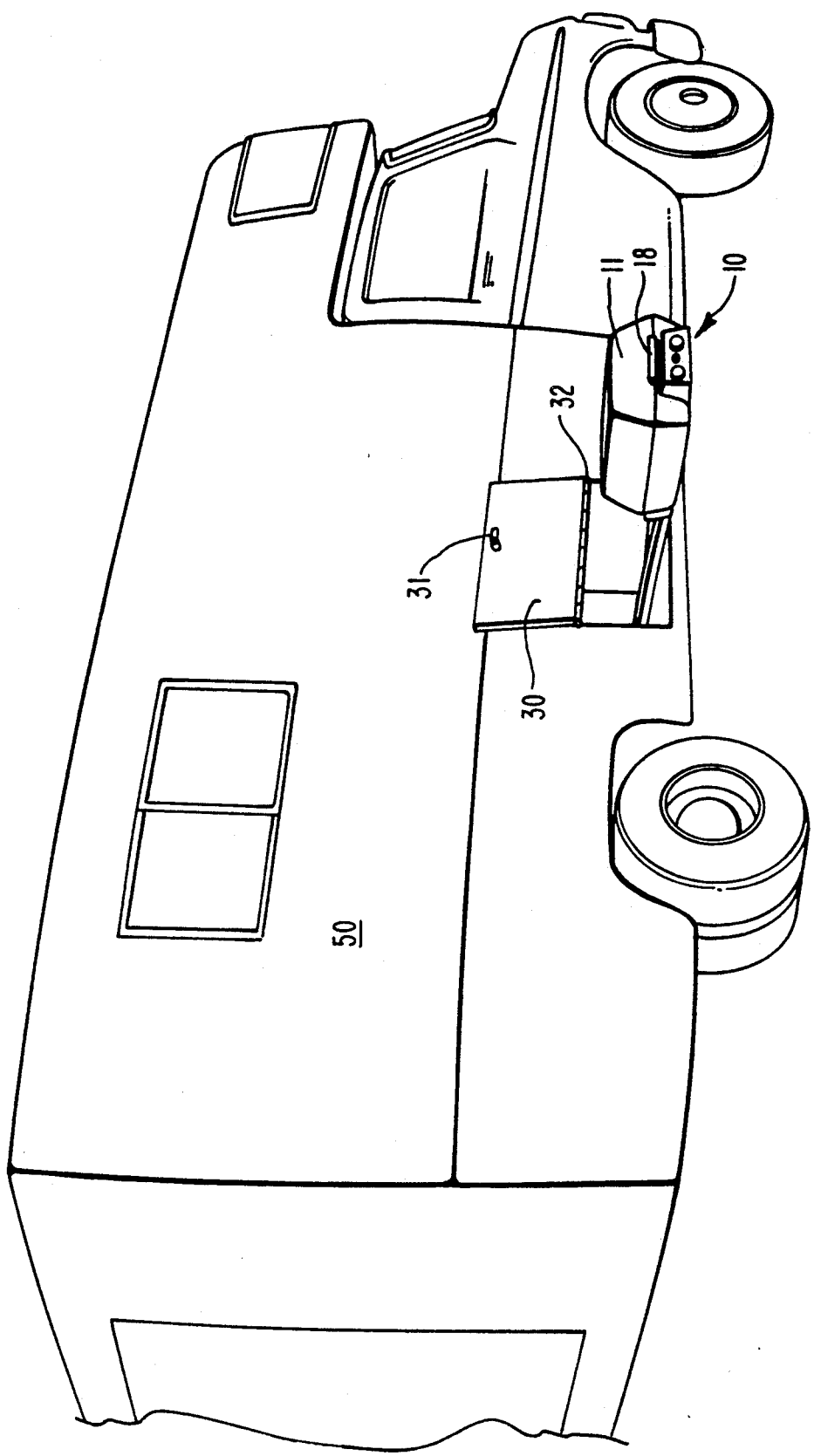
FIG. 1 is a perspective view of one presently preferred embodiment of the gas grill assembly of the present invention showing the assembly mounted in an external wall of a recreational vehicle and extended from the assembly housing for use.
Figure 2:
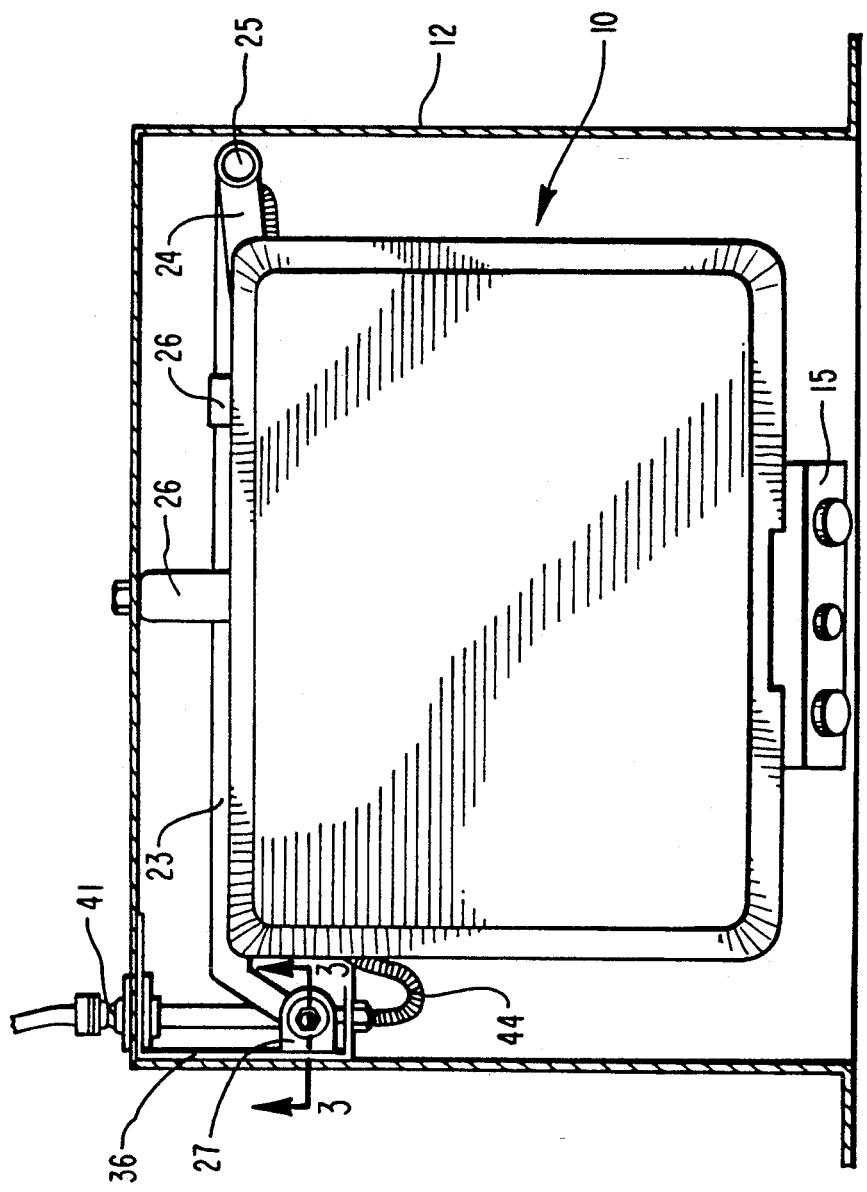
FIG. 2 is a top plan view of the embodiment of the gas grill assembly depicted FIG. 1, the grill being positioned inside the assembly housing for storage.
Figure 3:
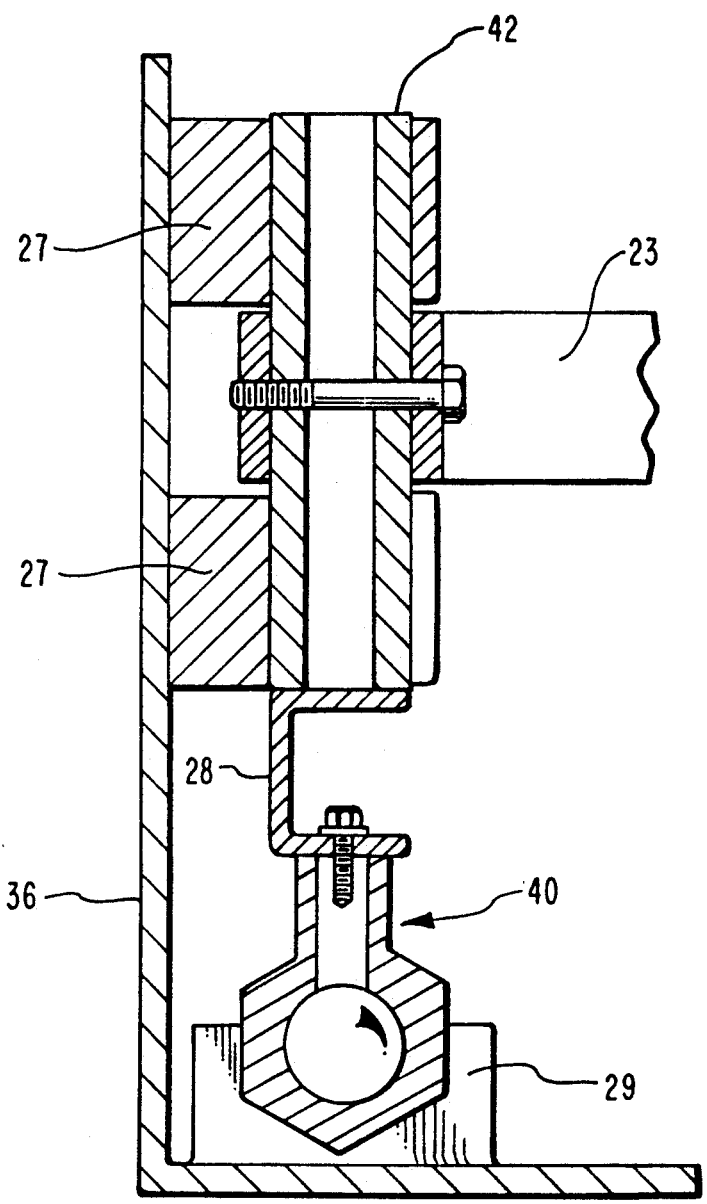
FIG. 3 is a vertical cross-sectional view of the gas supply valve assembly in its closed position taken along lines 3—3 of FIG. 2.
Figure 4:
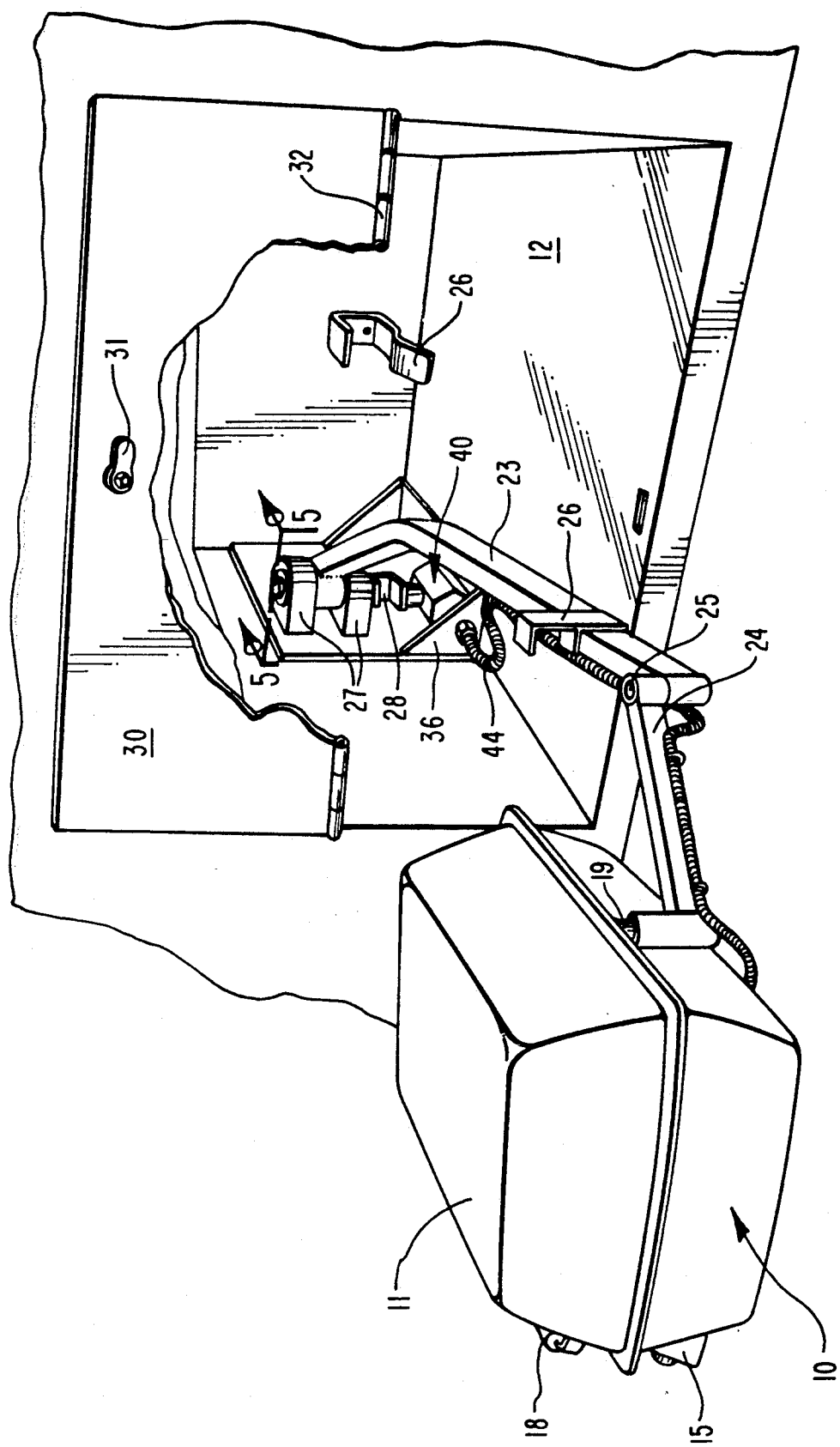
FIG. 4 is a detailed perspective view of the embodiment of the gas grill assembly depicted in FIG. 1, the grill being extended from the assembly housing for use.
Figure 5:
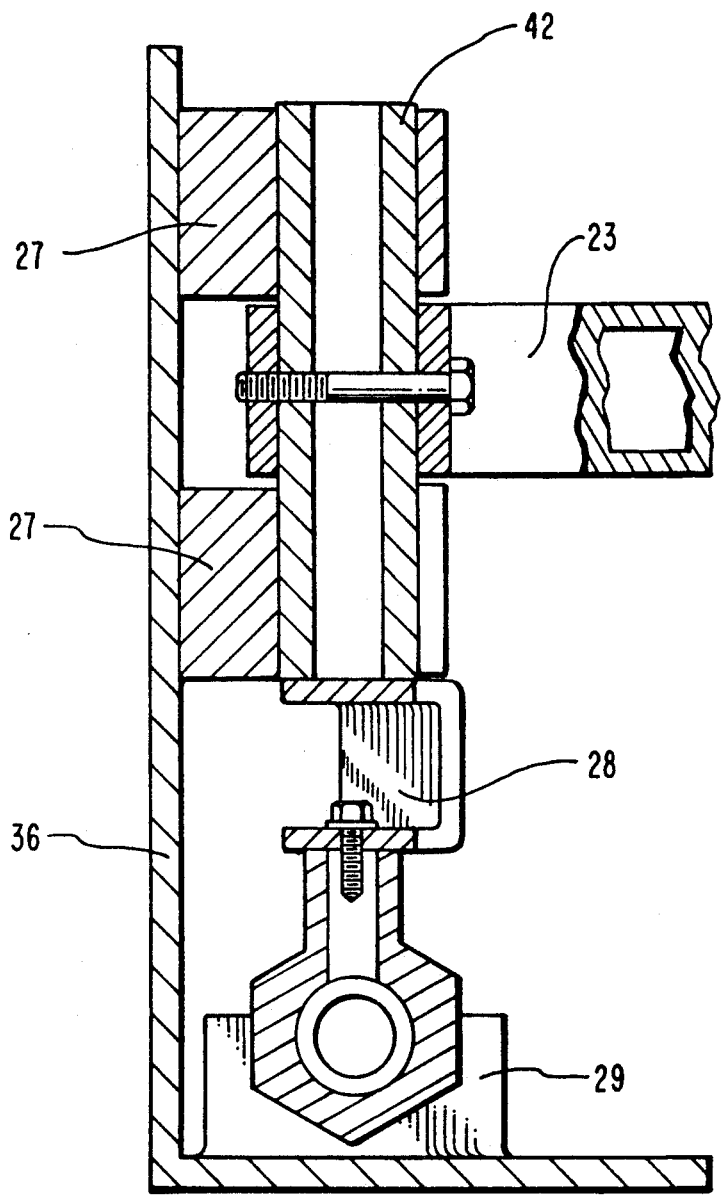
FIG. 5 is a vertical cross-sectional view of the gas supply valve assembly in its open position taken along lines 5—5 of FIG. 4.

One presently preferred embodiment of the gas grill assembly of the present invention is shown in its entirety in FIG. 1. As shown, the assembly may be mounted in an exterior wall of a recreational vehicle 50. Alternatively, it may in some cases be desirable to mount the assembly in an interior wall of a vehicle, such as, for example, when the assembly is to be used in a boat. Further, although described herein as being used with recreational vehicles, the gas grill assembly of the present invention might also be mounted in the walls of cabins, homes or other buildings.

In use, the door 30 of the assembly is opened or removed, such as, for example, by means of latch 31 and hinge 32. Hinge 32 may advantageously be spring biased toward an open position, or other suitable means may be provided for maintaining door 30 in an open position. The gas cooking grill 10 may then be pulled out for use. Significantly, as will be described in greater detail below, when grill 10 is pulled out, the assembly automatically turns on the gas supply to the grill.

When grill 10 is not is use, it may be simply pushed back into the wall for convenient storage. Importantly, this action automatically turns off the main gas supply to the grill. It is, therefore, impossible for grill 10 to be stored while being operatively connected to the main gas supply.

Referring now to FIGS. 2 through 5, the gas grill assembly of the present invention comprises a housing 12 for enclosing the assembly. Housing 12, and its associated door 30, are preferably formed of metal or some other suitable rigid or semi-rigid material. The front door 30 may preferably be latched shut when the gas grill 10 is not extended, thereby retaining the grill securely within housing 12. As shown in FIG. 1, for example, a suitable latch mechanism 31 may be centered on the bottom edge of door 30, while the top edge of door 30 has a suitable hinge 32 attached thereto.

With the door 30 open, the grill handle 18 may be grasped and used to pull the gas grill 10 out of housing 12. Handle 18 is also used to open the top 11 of gas grill 10 when the grill is in use. A conventional grill control panel 15 is mounted on or adjacent grill 10 and may, for example, include appropriate burner controls and a solid state ignition button which can be used to ignite the grill burners and control the gas flow in the grill.

The gas grill 10 is supported by a retractor assembly comprising arms 23 and 24. In the presently preferred embodiments illustrated herein, these arms support the full weight of grill 10. Accordingly, arms 23 and 24 may be fabricated from one inch (2.54 cm) square tube having one-eighth inch (3.18 mm) thick walls.

One end of arm 24 is connected directly to grill 10 such as, for example, by means of a mounting post 19 on the rear center edge of the gas grill 10. In this way, grill 10 is allowed to rotate nearly 180 degrees in either direction about post 19 when the grill positioned for use in its extended position. Thus, grill 10 may be readily positioned as desired to accommodate outdoor conditions such as wind direction.

The other end of arm 24 is rotatably connected to one end of arm 23, as shown, such as by means of a suitable retainer assembly 25. Retainer assembly 25 is attached to the ends of arms 23 and 24 and provides for both stability and relative movement of the retractor assembly arms 23 and 24 as the gas grill 10 is extended.

A C-shaped retractor assembly retainer spring 26 is attached to the rear inside wall of housing 12 so as to receive retractor arm 23. A similar retainer spring 26 is also attached to arm 23 so as to receive retractor arm 24. Springs 26 are constructed so as to extend above and below the received retractor arm 23 or 24 and hold the arms in place when grill 10 is fully positioned inside of housing 12.

The opposite end of arm 23 is rotatably connected to a mounting bracket 27 such as, for example, by means of a retaining pin 42. Mounting bracket 27 is firmly secured to housing 12, such as, for example, by means of a reinforcing bracket 36. Both mounting bracket 27 and reinforcing bracket 36 must have sufficient structural strength to hold grill 10 and arms 23 and 24, and brackets 27 and 36 may, therefore, be formed of steel.

Importantly, pin 42 in bracket 27 is secured to arm 23 so as to rotate with the arm. Pin 42 is also connected at its end to a linkage bracket 28 which is, in turn, connected to the main gas supply valve 40. Thus, as shown best in FIG. 3, linkage bracket 28 is rotated into a first position by movement of arm 23 and pin 42 such that valve 40 is closed when grill 10 is pushed into housing 12. Conversely, as shown best in FIG. 5, linkage bracket 28 rotates valve 40 into an open position when grill 10 is pulled from housing 12.

As shown, the gas valve 40 is attached to bracket 29 and mounted in the rear corner of housing 12, and the main gas supply attaches to valve 40 by means of a threaded nipple. A flexible gas supply tube 44 is connected from the output end of valve 40 to the burner controls of grill 10.

When properly assembled the gas grill 10 is supported by the retractor assembly arms 23 and 24 connected to the support mounting post 19 on the base of grill 10. As grill 10 is extended and the mounting post 19 moves forward it moves the retractor arm 23 forward and turns on the main gas valve 40 allowing the gas grill to operate. Thereafter, when the grill is retracted the main gas supply valve 40 is turned off and the gas grill is not supplied with fuel.

Figure 6:
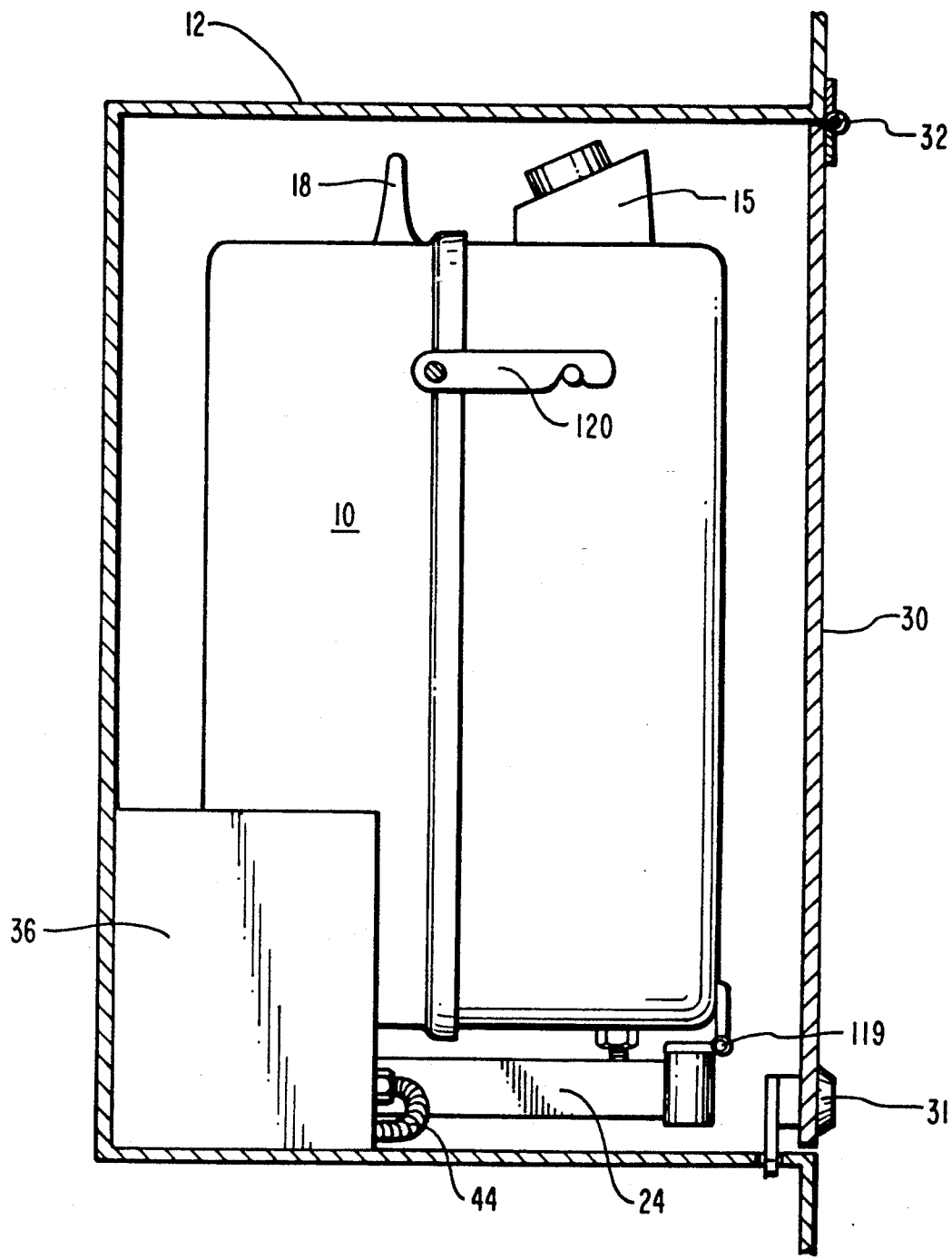
FIG. 6 is a side elevational view of a second presently preferred embodiment of the gas grill assembly of the present invention, the grill being positioned and latched inside the assembly housing for storage.
Figure 7:
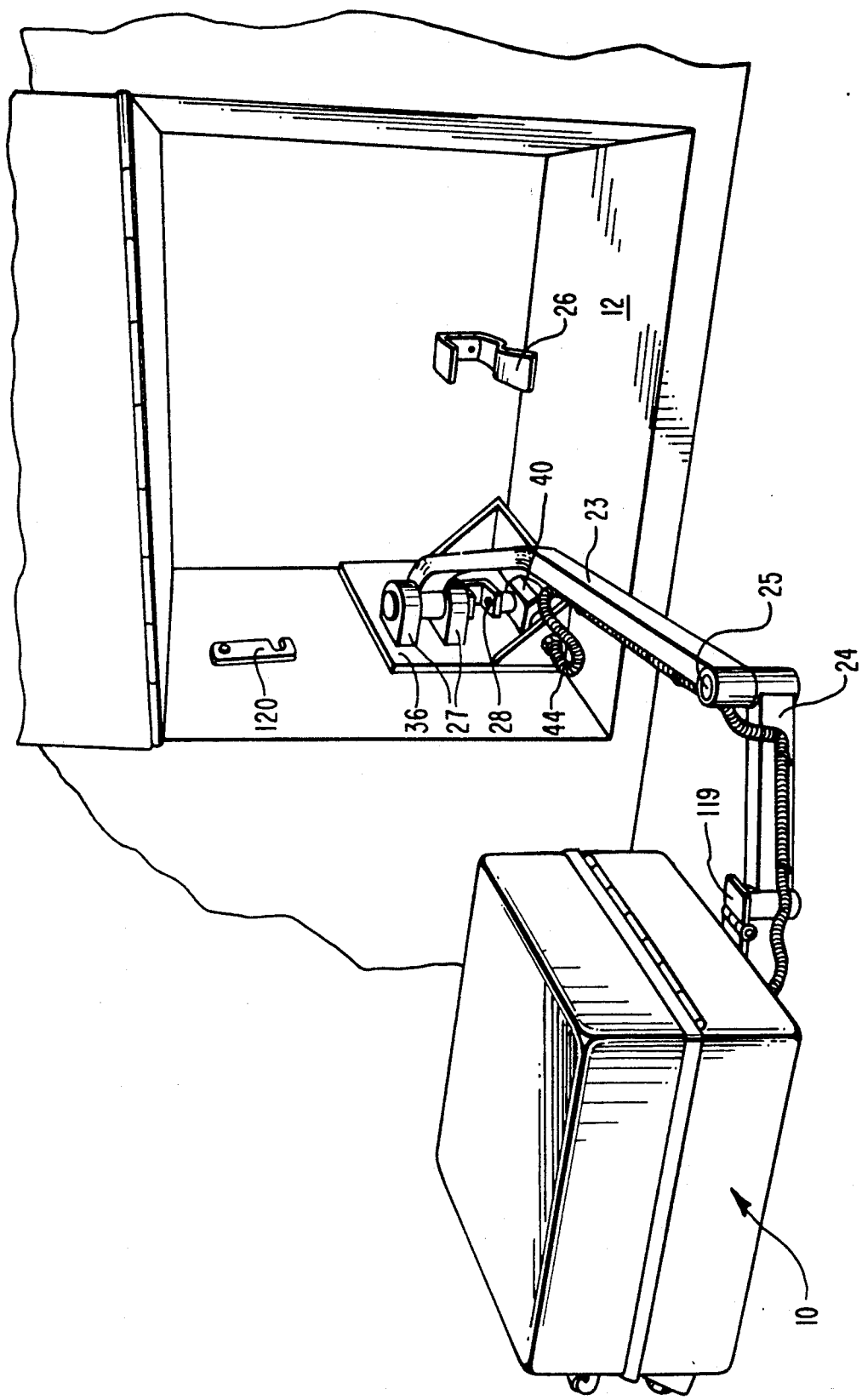
FIG. 7 is a side elevational view of the embodiment of the gas grill assembly depicted in FIG. 6, the grill being extended from the assembly housing for use, and the storage position of the grill being shown in broken lines.

FIGS. 6 and 7 illustrate a second preferred embodiment of the gas grill assembly of the present invention. As shown, the second embodiment is virtually identical to the first embodiment in all respects, except that mounting post 119 is connected by means of a hinge to grill 10. Thus, as shown in broken lines in FIG. 7, grill 10 may be rotated onto its side before it is pushed into housing 12. Then, as depicted in FIG. 6, grill 10 may be restrained and stabilized within housing 12 by means of a latch 120.

With the embodiment of FIGS. 1-5, it may sometimes be difficult to install a grill 10 of the desired size in the wall of a recreational vehicle 50 (see FIG. 1), because housing 12 may require an excessive depth for mounting. Using the embodiment of FIGS. 6 and 7, however, grill 10 is stored on its side, and housing 12 does not need to be as deep. Thus, this second embodiment may be used in situations when there would otherwise not be sufficient wall depth to mount the first embodiment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States letters patent is:

1. A gas grill assembly, comprising:
   a housing;
   a grill adapted to be received within the housing;
   a retractor arm assembly connected between the housing and the grill, the retractor arm assembly including at least one retractor arm which is capable of rotating about an axis between a first, retracted position and a second, extended position, the grill being positioned outside the housing when the retractor arm is in the second, extended position;
   a gas supply valve which is capable of rotating between a closed position and an open position; and
   means for coupling said rotatable retractor arm to said rotatable supply valve such that rotation of the retractor arm causes a rotation of said supply valve, and such that rotation of the retractor arm to said first, retracted position results in rotation of said gas supply valve to said closed position and rotation of the retractor arm to said second, extended position results in rotation of said gas supply valve to said open position.

2. A gas grill assembly, comprising:
   a housing;
   a gas grill adapted to be received within the housing;
   a retractor arm assembly connected between the housing and the grill, the retractor arm assembly including at least one retractor arm which is capable of rotating about an axis between a first, retracted position and a second, extended position, the grill being positioned outside the housing when the retractor arm is in the second, extended position;
   a gas supply valve, the valve including a shaft which is capable of rotating about an axis so as to rotate the valve between a closed position and an open position; and
   means for coupling said rotatable retractor arm to the shaft of said supply valve such that rotation of the retractor arm causes a rotation of said supply valve, and such that rotation of the retractor arm to said first, retracted position results in rotation of said gas supply valve to said closed position and rotation of the retractor arm to said second, extended position results in rotation of said gas supply valve to said open position.

3. A gas cooking unit assembly, comprising:
   a housing;
   a cooking unit adapted to be received within the housing;
   a retractor arm assembly connected between the housing and the cooking unit, the retractor arm assembly including at least one retractor arm which is capable of rotating about an axis between a first, retracted position and a second, extended position;
   a gas supply valve which is capable of rotating between a closed position and an open position; and
   means for coupling said rotatable retractor arm to said rotatable supply valve such that rotation of the retractor arm causes a rotation of said supply valve, and such that rotation of the retractor arm to said first, retracted position results in rotation of sad gas supply valve to said closed position and rotation of the retractor arm to said second, extended position results in rotation of said gas supply valve to said open position.

* * * * *